(12) United States Patent
Tong

(10) Patent No.: US 12,451,700 B2
(45) Date of Patent: Oct. 21, 2025

(54) STORED-ENERGY POWER SYSTEMS

(71) Applicant: Yui Lung Tong, Hong Kong (CN)

(72) Inventor: Yui Lung Tong, Hong Kong (CN)

(*) Notice: Subject to any disclaimer, the term of this patent is extended or adjusted under 35 U.S.C. 154(b) by 43 days.

(21) Appl. No.: 18/566,115

(22) PCT Filed: Jun. 2, 2022

(86) PCT No.: PCT/IB2022/055160
§ 371 (c)(1),
(2) Date: Dec. 1, 2023

(87) PCT Pub. No.: WO2022/254372
PCT Pub. Date: Dec. 8, 2022

(65) Prior Publication Data
US 2024/0258798 A1    Aug. 1, 2024

(30) Foreign Application Priority Data

Jun. 2, 2021 (HK) .............. 32021032219.6

(51) Int. Cl.
*H02J 3/32* (2006.01)
*B60L 53/51* (2019.01)
*B60L 53/53* (2019.01)
*H01M 10/0525* (2010.01)
*H01M 10/46* (2006.01)
*H01M 50/213* (2021.01)
*H02J 3/38* (2006.01)

(52) U.S. Cl.
CPC ............ *H02J 3/32* (2013.01); *H01M 10/0525* (2013.01); *H01M 10/46* (2013.01); *H01M 50/213* (2021.01); *H02J 3/38* (2013.01); *B60L 53/51* (2019.02); *B60L 53/53* (2019.02); *H01M 2220/20* (2013.01); *H02J 2300/24* (2020.01)

(58) Field of Classification Search
CPC ............ H02J 3/32; H02J 3/38; H02J 2300/24; H01M 50/213; H01M 10/0525; H01M 10/46; H01M 2220/20; B60L 53/51; B60L 53/53
USPC .......................................................... 307/24
See application file for complete search history.

(56) References Cited

U.S. PATENT DOCUMENTS 11,108,251 B2 *   8/2021   Kirleis .................. B64U 10/25
2018/0205222 A1   7/2018   Hayes et al.
2019/0081502 A1   3/2019   Botts et al.

FOREIGN PATENT DOCUMENTS

CN     103390900 A    11/2013
CN     105932764 A     9/2016
(Continued)

OTHER PUBLICATIONS

International Search Report of PCT Patent Application No. PCT/IB2022/055160 issued on Sep. 26, 2022.
(Continued)

*Primary Examiner* — Hal Kaplan

(57) ABSTRACT

A stored-energy power system and a stored-energy apparatus are disclosed. The stored-energy power system comprises a photovoltaic arrangement (120) for converting solar energy into electrical energy for output, a battery arrangement (140), and a power management arrangement (160). The stored-energy apparatus comprising a battery arrangement (140), a switching arrangement, a power management arrangement (160), and an apparatus housing.

20 Claims, 8 Drawing Sheets

(56) References Cited

FOREIGN PATENT DOCUMENTS

Figure 1:
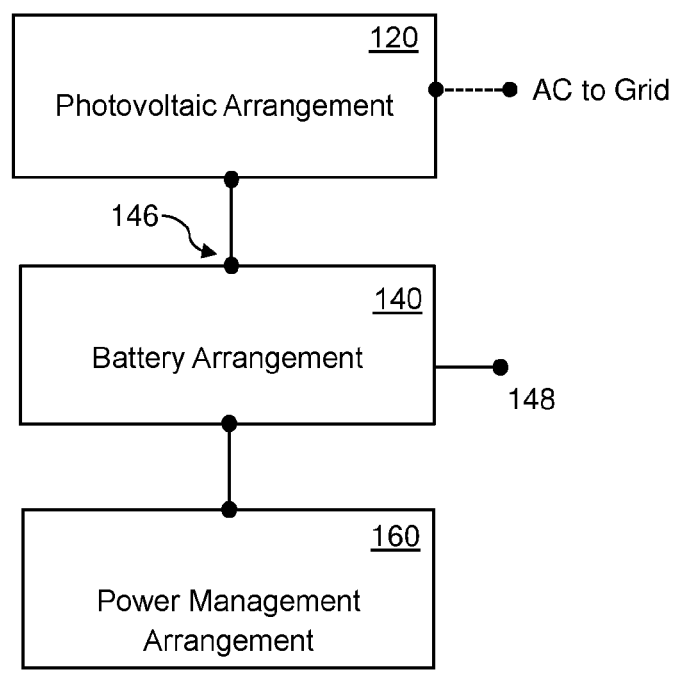

| EP | 2685590 B1 | 3/2017 |
| WO | 2019082776 A1 | 5/2019 |

OTHER PUBLICATIONS

European Search Report of European Patent Application No. 22815470.4 issued on Oct. 17, 2024.

\* cited by examiner

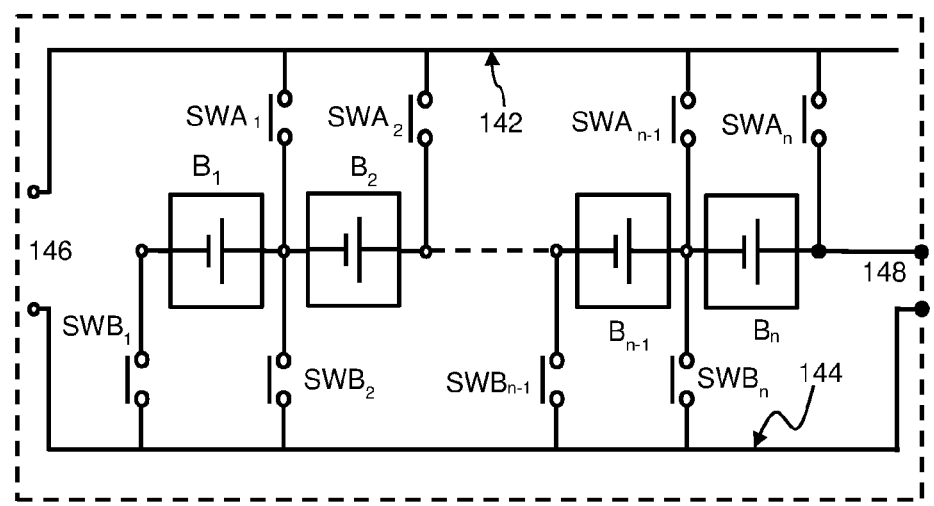
Figure 2
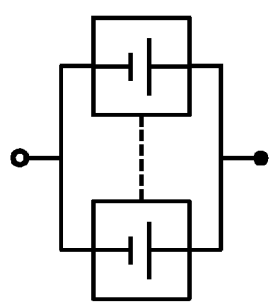
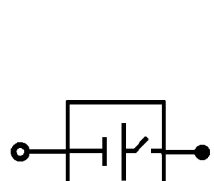
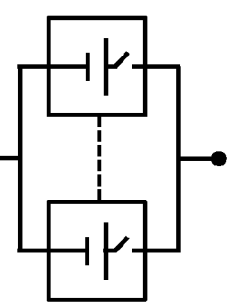
Figure 2A          Figure 2B          Figure 2C

STORED-ENERGY POWER SYSTEMS

FIELD

The present disclosure relates to stored-energy power systems, in particular photovoltaic stored-energy power systems, and more particularly to photovoltaic stored-energy power systems having a high voltage power output.

BACKGROUND

Solar energy is a form of green energy which is practically non-exhaustible and utilization thereof is highly advantageous. Solar energy is collected by photovoltaic arrangements which are configured to convert solar energy into electrical energy. Currently, solar energy is mostly collected by photovoltaic arrangements comprising solar panels. A solar panel typically comprises a housing and a plurality of solar cells connected in series and in parallel. A solar cell has a very low output voltage, typically less than 1 volt (V), and solar panels are typically configured to have a rated output voltage of 50V or below.

Battery powered electrical vehicles (EVs) are currently considered as one of the most environmentally friendly road-going transportation means. To provide a reasonable driving power and a reasonable driving range, road-going EVs typically have a stored energy in multikilowatt terms. The stored energy of EVs is typically configured to operate in a high-voltage range, that is in multi-hundred volts exceeding 200V, for example, 300V to 450V DC in private cars and up to 750V in commercial vehicles.

On-board batteries are currently the most common form of energy storage devices which are used for supplying stored electrical energy to operate EVs. To mitigate the need to perform excessive voltage conversion, batteries on board an EV are typically arranged to have an operating voltage range comparable to the operating voltage range of the EV.

There are currently two main types of EV chargers, namely, AC chargers and DC chargers. AC chargers are power couplers that connect an AC power line to an EV, for example, by means of a cable and a charging gun connected to an end of the cable. In AC charging, AC/DC conversion is done by a low-power on-board charger which is built in to the EV. DC chargers are high-power rapid chargers which are configured to bypass the on-board charger of an EV and to charge batteries on-board an EV directly. Typical DC chargers comprise power converters for AC/DC and/or DC-DC conversion.

Currently, 99% of EV chargers on the market are AC chargers, there are only a few DC rapid charging stations in Hong Kong. The majority of EVs is charged by the slow on-board charger. This is because the high-power AC/DC convertors of a rapid charger is very difficult to manufacture, for very high efficiency is needed for the high-power, and, HVDC with the wide output range (50 v-500 v for the Japanese CHAdeMO standard, and 100 v-1000 v for the EU IEC Combo standard) is hard to achieve.

While EVs are considered environmentally friendly, at least compared to their internal combustion engine (ICE) counterparts, the power consumption of an EV is still high and comparable to the power consumption of an average home.

It is desirable to provide stored-energy power systems which can utilize solar power for EV charging and/or other useful purposes.

SUMMARY

A stored-energy power system and a stored-energy apparatus are disclosed.

The stored-energy power system comprises a photovoltaic arrangement for converting solar energy into electrical energy for output, a battery arrangement, and a power management arrangement.

The stored-energy apparatus comprises a battery arrangement, a switching arrangement, a power management arrangement, and an apparatus housing.

The battery arrangement comprises a plurality of battery cells, a first power interface, a second power interface. The battery arrangement of the system includes a switching arrangement.

The plurality of battery cells is arranged into a plurality of battery groups, each battery group comprising a single battery cell or a plurality of interconnected battery cells.

The first power interface is coupled to the photovoltaic arrangement for receiving solar-electrical energy.

The second power interface is configured for power input from an external power source or power output to an external load.

The switching arrangement is operable in a first mode or a second mode.

The battery arrangement is electrically connected to the first power interface and the first power interface has a first rated voltage when the switching arrangement is in the first mode.

The battery arrangement is electrically connected to the second power interface, and the second power interface has a second rated voltage when the switching arrangement is in the second mode, the second rated voltage being higher than the first rated voltage.

FIGURES

Figure 3:
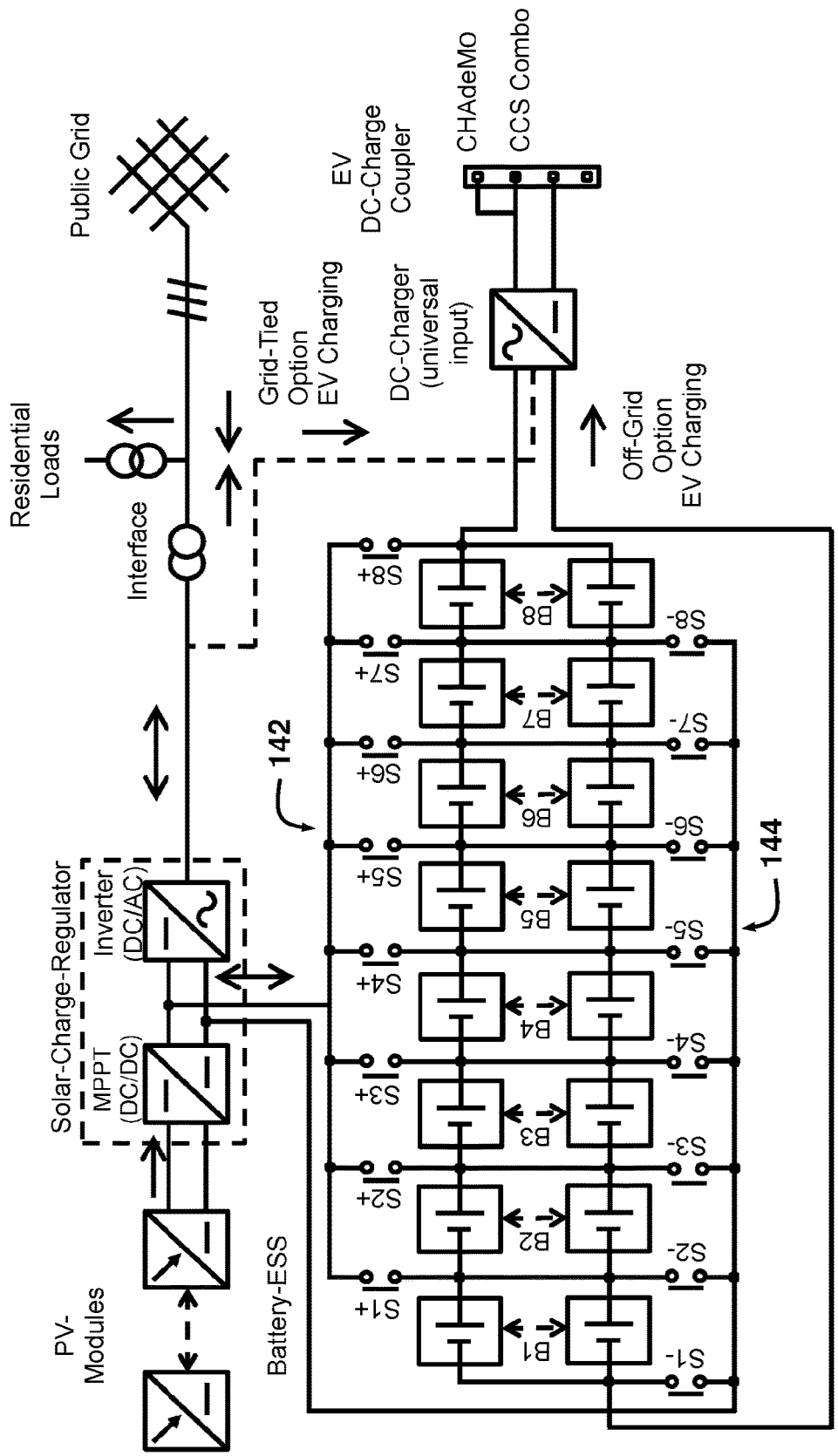
Figure 4:
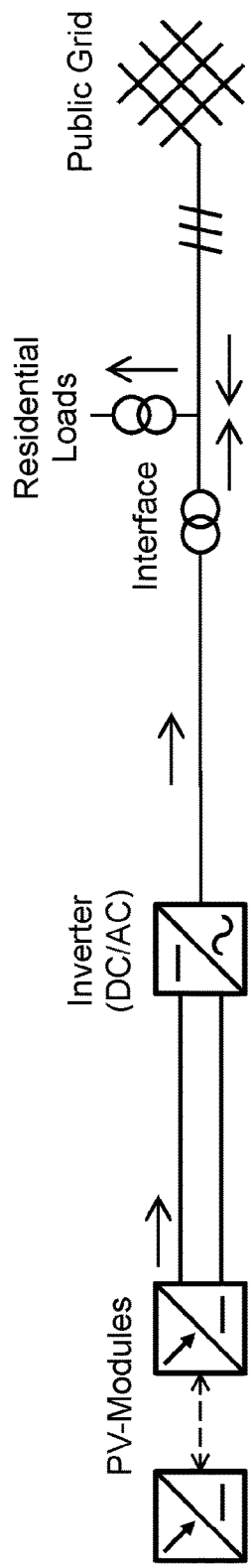
Figure 5:
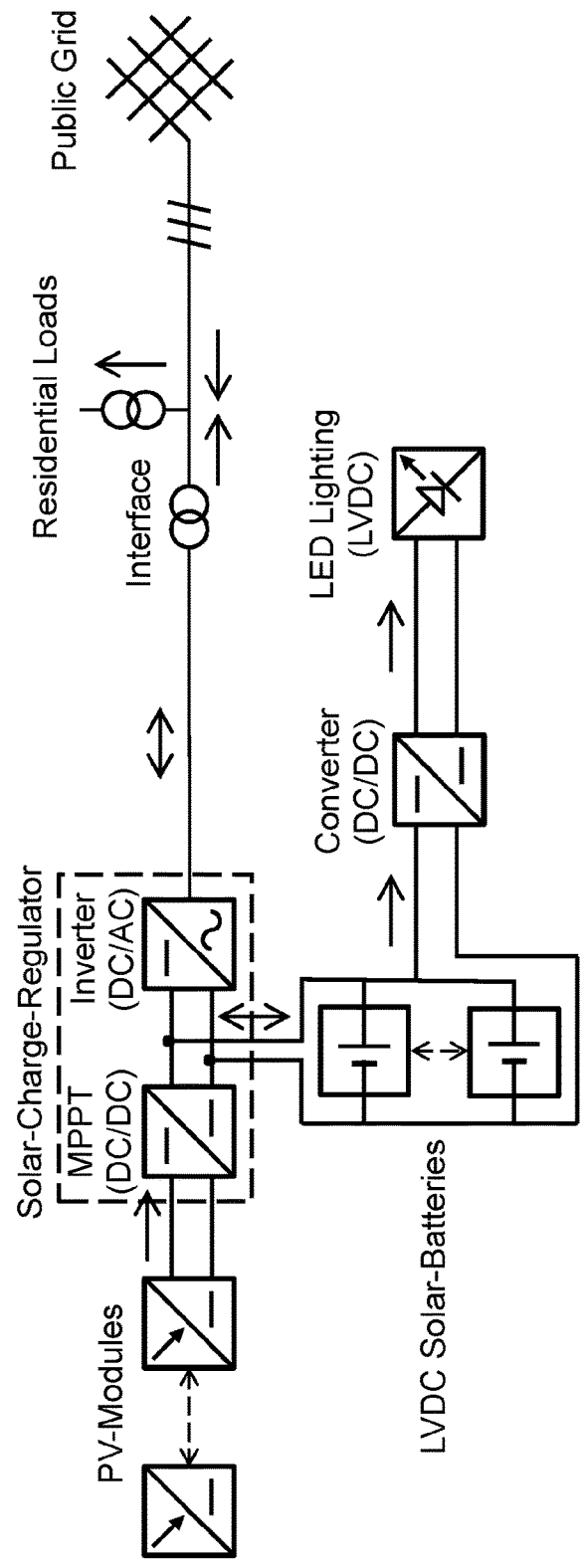
Figure 6:
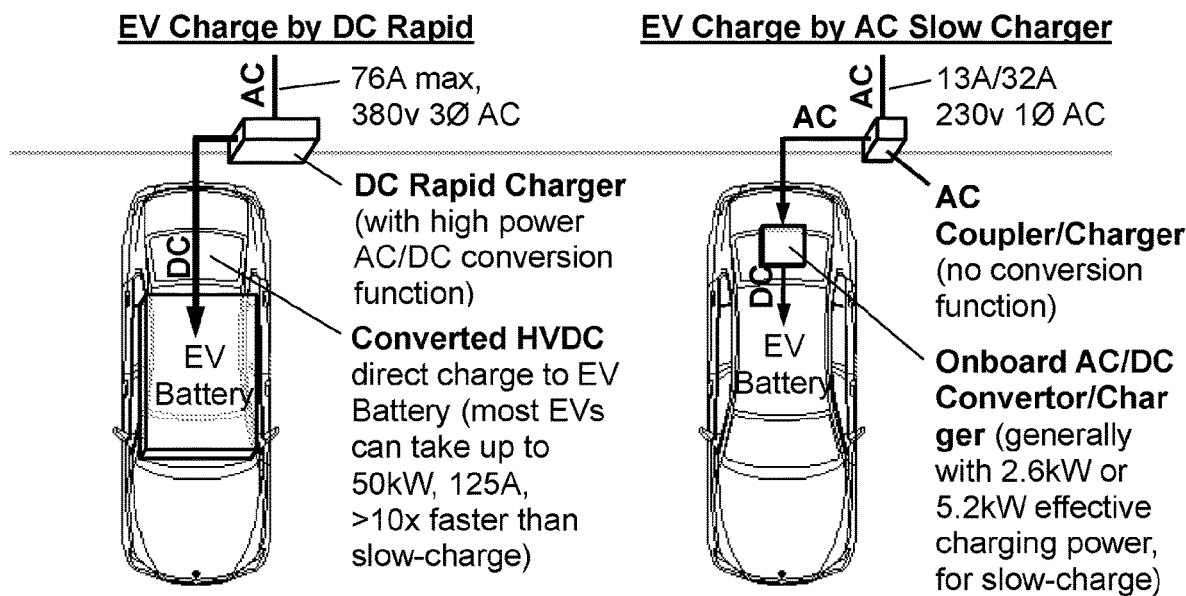
Figure 7:
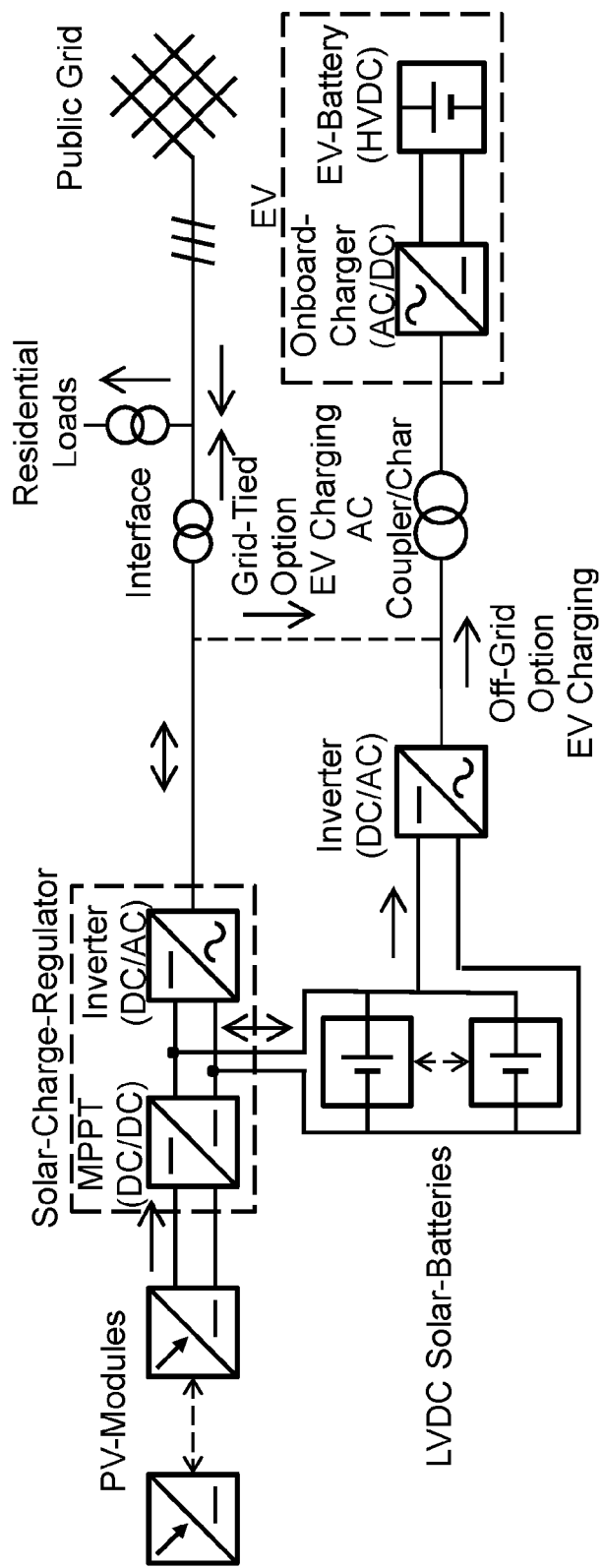
Figure 8:
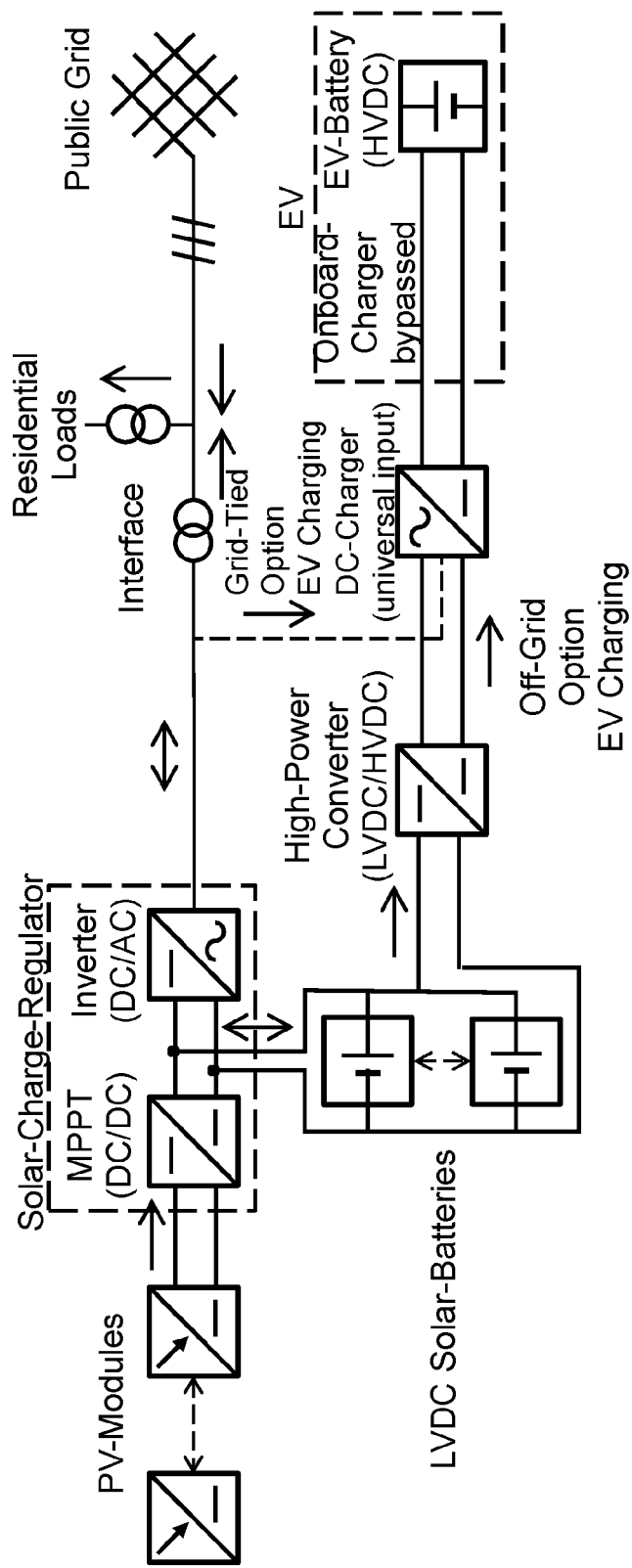
Figure 9:
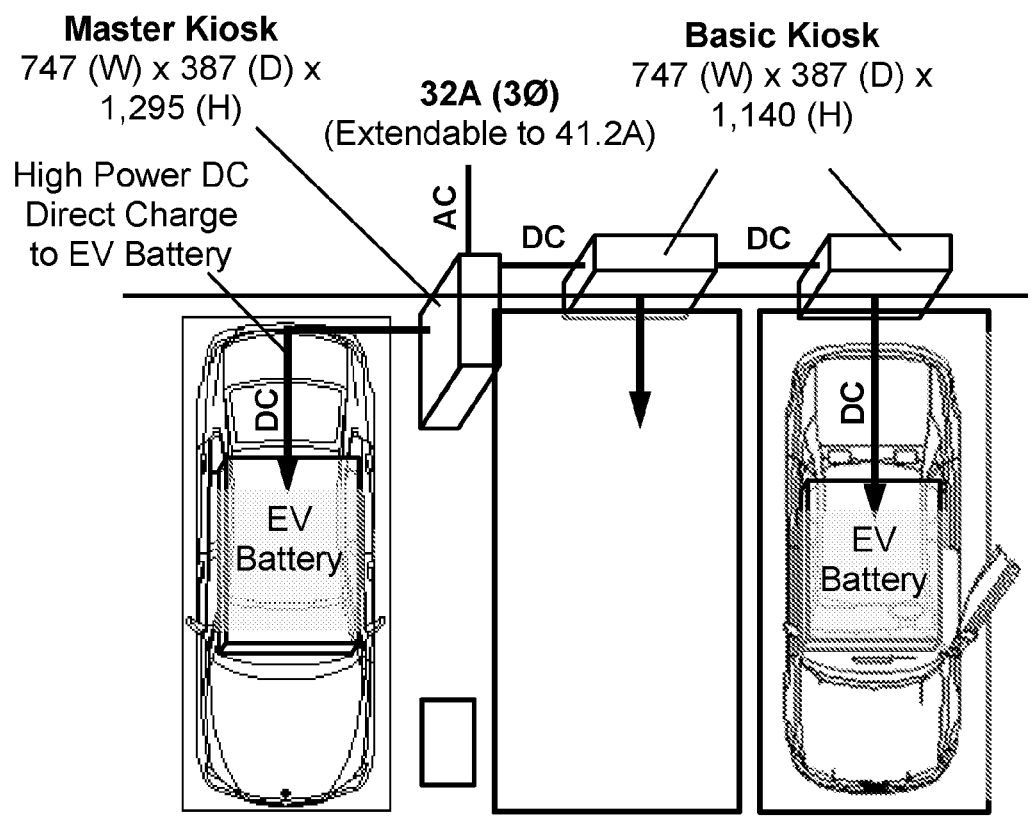

The present disclosure is made with reference to example, embodiments and the accompanying figures, in which, FIG. 1 is a block diagram of the stored-energy power system of the present disclosure, FIG. 2 is a block diagram of a battery arrangement of the system of FIG. 1, FIGS. 2A, 2B and 2C are example internal configurations of battery groups, FIG. 3 is an example stored-energy power system of the present disclosure, FIG. 4 is an example stored-energy power system comprising a SCR, FIG. 5 is an example hybrid stored-energy power system comprising a bidirectional SCR, FIG. 6 is an example EV charging system using a stored-energy power system of the present disclosure, FIG. 7 is an example stored-energy power system of the present disclosure, FIG. 8 is an example EV charging system using a stored-energy power system of the present disclosure including a high-power converter, and FIG. 9 is an example EV charging system using a stored-energy power system of the present disclosure.

DESCRIPTION

A stored-energy power system 10 disclosed herein comprises a photovoltaic arrangement 120, a battery arrangement 140, and a power management arrangement 160, as shown in FIG. 1.

The photovoltaic arrangement is for converting solar energy into electrical energy, and may comprise photovoltaic cells which are arranged into a plurality of solar panels. The solar panels may be connected in series and/or parallel in order to deliver solar power at a rated voltage. A typical solar cell has an open-circuit voltage of about 0.5 to 0.6 volts (V) at 25° Celsius when exposed to a full solar irradiance, although solar cells having a rated output voltage of between 2-4V are available. A solar panel is typically arranged to have a nominal output voltage which is a multiple of 12V, for example, 12V, 24V, 36V, 48V, 60V, etc. Solar panels are typically arranged to output power at a relatively low voltage in the low-voltage DC (LVDC) range, for example at or below 50V to mitigate risks of electric shock. Of course, solar panels can be arranged to output a voltage of higher than 50V, for example between 50 and 100 volts, or even higher. Voltage regulators may be included in the system to regulate electrical power output of the photovoltaic arrangement at a regulated voltage. The photovoltaic arrangement may comprise a solar power optimization arrangement, for example, a maximum power point tracker (MPPT) for optimization of solar power reception by the solar cells. The photovoltaic arrangement may optionally comprise an inverter and a power grid outlet. The inverter may comprise a DC/AC converter for converting solar-electricity into alternating current (AC) power meeting power grid requirements and the power grid outlet is configured for outputting solar-energy converted electricity to the power grid.

The battery arrangement is configured for storing electrical energy for subsequent use. The subsequent use may be, for example, charging of an electrical vehicle or electrical vehicles, supplying power to operate electrical tools, appliances, or apparatuses, or other applications without loss of generality. The subsequent use may be at a voltage which is in the high-voltage DC (HVDC) range that is substantially higher than 50V, for example, at 100V or above, 200V or above, 300V or above, 400V or above, 500V or above, 600V or above, 700V or 750V or above.

While a battery arrangement having a high energy storage capability is advantageous, the costs of the batteries to provide a high energy storage capability may be prohibitively high. In example embodiments, the battery arrangement may be configured to store an amount of energy which is sufficient for a designed purpose. For charging an electrical vehicle, the battery arrangement may have a rated power comparable to or higher than the stored energy of the vehicle. Where the battery arrangement is configured as a back-up or an emergency power source, the battery arrangement may be configured to have a stored energy sufficient to provide a fraction, say, between 10% to 30% of the stored energy capacity of an electrical vehicle, especially when the battery arrangement is part of a mobile power system.

The battery arrangement comprises a plurality of battery cells which is arranged into a plurality of battery groups. The battery cells may be high-performance battery cells having a high energy density by weight and/or by volume, so that more energy can be stored for a given weight and/or a given volume. Currently, Lithium-ion batteries offer a good balance between performance, reliability and costs. Other batteries having good or better performance-to-price-ratio are expected to be available from time to time, and may be used to form the battery arrangement.

The battery cells may comprise used battery cells which are removed from electric vehicles, for example, from decommissioned electrical vehicles. Used battery cells having a good state of health (SoH) may be selected as battery cells of a battery group. An SoH of 65%, 70% or higher may be considered as a good SoH for the purpose of the present application, although the SoH of used battery cells is expected to be at 90% or lower. Where a longer service life or a better performance is required, the battery cells of the battery arrangement may be all new battery cells having an SoH of, say, between 95% and 100%.

Referring to FIG. 2, the battery groups $B_1, \ldots, B_n$ of the battery arrangement 140 are connected in a cascade to form an assembly of battery groups comprising n battery groups connected in series, n being a natural number larger than 1. The cascade of battery groups may be formed by hard wiring or switches, and the switches may be mechanical, electro-mechanical, electronic, magnetic, or other types of switches available from time to time.

Each battery group may comprise one or a plurality of battery cells. The battery cells forming a battery group may be connected in parallel and/or in series. Each battery group has a first battery group terminal (first terminal in short) having a first electrical polarity, a second battery group terminal (second terminal in short) having a second electrical polarity, and a battery-group voltage which is measured between the first terminal and the second terminal.

The assembly of battery groups comprises a first battery-assembly terminal having a first electrical polarity, a second battery-assembly terminal (second terminal in short) having a second electrical polarity, and a battery-assembly voltage which is measured between the first battery group and the last battery group of the cascade-connected battery groups.

The battery assembly is arranged such that each battery group except the first battery group and the last battery group are connected to a pair of adjacent battery groups. A battery group which is intermediate the first battery group and the last group is referred to as an intermediate battery group for convenience. More specifically, the first terminal of an intermediate battery group is connected to the second terminal of an adjacent battery group, and the second terminal of the intermediate battery group is connected to the first terminal of another adjacent battery group.

The battery assembly may be configured such that the first battery group has a second terminal which is not connected to an adjacent battery group and a first terminal which is connected to an adjacent battery group; and the last battery group, which is the n-th ($n^{th}$) battery group, has a second terminal which is connected to an adjacent battery group and a first terminal which is not connected to an adjacent battery group, as depicted in FIG. 2. In the configuration of FIG. 2, the first terminal of the last battery group is the first battery assembly terminal and the second terminal of the first battery group is the second battery assembly terminal.

In an alternative configuration, the battery assembly may be configured such that the first battery group has a second terminal which is connected to an adjacent battery group and a first terminal which is not connected to an adjacent battery group, and the last battery group has a second terminal which is not connected to an adjacent battery group and a first terminal which is connected to an adjacent battery group. In this alternative configuration, the first terminal of the first battery group is the first battery assembly terminal and the second terminal of the last battery group is the second battery assembly terminal.

The cascaded assembly of battery groups has a maximum total voltage which is measured between the first battery group ($B_1$) and the last battery group ($B_n$). More specifically, the maximum total voltage is measured between battery group terminals of opposite electrical polarities of the first battery group ($B_1$) and the last battery group ($B_n$). For example, the maximum total voltage of the battery assembly may be measured between the first terminal on the first battery group and the second terminal of the last battery group or between the second terminal on the first battery group and the first terminal of the last battery group. The maximum total voltage is equal to the sum of the individual battery-group voltages of the n battery groups forming the cascaded battery assembly. For example, where the cascade has n battery groups, and each battery group has the same battery group voltage, the maximum total voltage of the battery assembly equal to n times the battery-group voltages due to their connection in series.

Referring to FIGS. 1 and 2, the battery arrangement comprises a first power rail 142, a second power rail 144, a first power interface 146, a second power interface 148, and a plurality of power switches.

Referring to FIGS. 2A, 2B and 2C, a battery group herein may comprise a battery module or a plurality of battery modules. A battery module may comprise a single battery cell or a plurality of battery cells. The battery cells forming a battery module may be interconnected and/or not interconnected. The interconnected battery cells of a battery module may in parallel and/or in series connection. The interconnection between battery cells of a battery module may be hardwired, that is, not switchable (as shown in FIG. 2A) or switchable (as shown in FIGS. 2B and 2C). The battery modules forming a battery group may be in parallel and/or in series connection.

Each battery module comprises a module housing, battery cells received inside the module housing, and module terminals comprising a pair of terminals of opposite polarity for making external electrical connection. A module housing may be a plastic housing or a housing comprising a combination of plastic and metallic parts to facilitate heat dissipation. The module housing is preferably vented to allow release of gaseous discharge which may be built up during charging or discharging of the battery cells during battery operations.

Each battery module may comprise a temperature conditioning arrangement which is configured to activate when temperature inside the module housing reaches a threshold temperature. The temperature conditioning arrangement may comprise an air-moving arrangement and/or temperature conditioning elements. The air-moving arrangement may comprise a fan or a plurality of fans which is configured to move air through the module housing whereby temperature of the battery cells inside the module is conditioned. The temperature conditioning arrangement may comprise a solid-state temperature conditioning device, for example, Peltier elements. The battery module may comprise a temperature sensing arrangement which is configured to monitor internal temperature of the battery module. The temperature sensing arrangement may comprise a temperature sensor or a plurality of temperature sensors. A temperature sensor may have its output connected to a detection circuit. The detection circuit may have an output which is connected to the controller or an activation circuit which is configured to activate the temperature conditioning arrangement when internal temperature of the battery module has reached a threshold temperature. The activation circuit may be configured to activate the temperature conditioning arrangement in response to activation signal(s) generated by the detection circuit when the threshold temperature is reached. A lower threshold temperature and/or an upper threshold temperature may be set. The upper threshold temperature and the lower threshold temperature cooperate to define an operational temperature range of the battery arrangement. A preferred operational temperature range may for example be the difference in temperature between the upper threshold temperature and the lower threshold temperature. The upper threshold temperature may be set at a predetermined temperature which is well below the thermal run-away threshold temperature above which thermal run-away is expected to happen and the battery cell will begin to melt down. The predetermined temperature may be set at, say, 5, 10, 15, 20 degrees below the thermal run-away threshold temperature.

A battery module herein may be configured to have a rated stored energy capacity of one kWh or higher, for example, 1, 2, 3, 4, 5, 6, 7, 8, 9, 10, 15, 20, 25, 30, etc. kWh. The battery module may be constructed from cylindrical battery cells, for example, 18650-sized battery cells. Where a battery cell has an energy capacity of x Wh, a plurality of y battery cells are required for each kWh energy storage capacity, y being a natural number. For example, 136 lithium-ion cells each of 7.4 Wh rating are required to be assembled for each kWh energy storage capacity. A battery module or a battery group may be arranged in the form of jSkP, where j is the number of cells in series connection and k is the number of cells in parallel connection.

The plurality of power switches comprises a first set of power switches, $SWA_1, \ldots, SWA_n$, interconnecting the first terminals of the battery groups and the first power rail 142, and a second set of power switches, $SWB_1, \ldots, SWB_n$, interconnecting the second terminals of the battery groups and the second power rail 144. The power switch is operable in an on-state or an off-state and comprises a first terminal, a second terminal and a third terminal which is a control terminal. The first terminal and the second terminal cooperate to define a switchable current path. When an on-signal is applied to the control terminal, the power switch will be in the on-state and the current path is in an on-state having a very low on-resistance, for example, in milliohm or sub-milliohm terms, so that current can flow between the first terminal and the second terminal with very low power loss. When an off-signal or no on-signal is applied to the control terminal, the power switch will be in the off-state and the current path is in an off-state having a very high off-resistance, for example, in megaohm or multi-megaohm terms and flow of current between the first terminal and the second terminal is impeded. When the power switch is in the off-state, the power rail and the battery group terminal connected by the power switch are at the same voltage, that is same electrical potential, and the voltage drop across the current path is negligible by selecting a power switch having a very low on-resistance. Field effect transistors (FET) such as MOSFETs are example of suitable power switches for the present applications.

The first power interface 146 is a power port comprising a first terminal which is a first port terminal connected to the first rail 142 and a second terminal which is a second port terminal connected to the second rail 144.

The second power interface 148 is a power port comprising a first terminal which is a first port terminal directly and/or fixedly connected to the first battery-assembly terminal of the battery assembly and a second terminal which is a second port terminal connected to the second rail 144. The first battery-assembly terminal of the battery assembly in the example of FIG. 2 is also the first terminal of the last battery group, and the second rail 144 is connected to the second battery-assembly terminal of the battery assembly by a power switch $SWB_1$.

In an alternative configuration, the second battery-assembly terminal of the battery assembly is directly and/or fixedly connected to the second port terminal of the second power interface 148, and the first battery-assembly terminal of the battery assembly is connected to the first port terminal of the second power interface 148 by one of the plurality of switches.

The plurality of power switch of the battery arrangement comprising the first set of switches and the second set of switches may be operated as a single set of switches. For example, all the switches of the first and second set of switches may be turned on or turned off at the same time, that is, by the same control signal.

When all the switches $SWA_1, \ldots, SWA_n$ of the first set of switches are turned on or in the on-state, the first rail 142 is electrically connected to battery groups $B_1, \ldots, B_n$. When all the switches $SWA_1, \ldots, SWA_n$ of the first set of switches are turned off or in the off-state, the first rail 142 is electrically isolated from the battery groups $B_1, \ldots, B_n$.

When all the switches $SWB_1, \ldots, SWB_n$ of the second set of switches are turned on or in the on-state, the second rail 144 is electrically connected to battery groups $B_1, \ldots, B_n$. When all the switches $SWB_1, \ldots, SWB_n$ of the second set of switches are turned off or in the off-state, the second rail 144 is electrically isolated from battery groups $B_1, \ldots, B_n$.

When all the switches $SWA_1, \ldots, SWA_n$ and $SWB_1, \ldots, SWB_n$, of the first and second sets of switches are turned on or in the on-state, the battery groups $B_1, \ldots, B_n$ are in parallel connection, even though the battery groups $B_1, \ldots, B_n$ may be connected in a cascade by hard-wired connection.

When all the switches $SWA_1, \ldots, SWA_n$ and $SWB_1, \ldots, SWB_n$ of the first and second sets of switches are turned off or in the off-state, the battery groups $B_1, \ldots, B_n$ are electrically isolated from the battery groups $B_1, \ldots, B_n$, and the battery groups $B_1, \ldots, B_n$ will remain in a cascaded connection.

Each or every one of the power switches $SWA_1, \ldots, SWA_n$ and $SWB_1, \ldots, SWB_n$ may be individually or independently controlled.

In example configurations, any one power switch of the first set of power switches, $SWA_1, \ldots, SWA_n$, may be turned on while all the other power switches of the first set of power switches are turned off, irrespective of the switching state of the second set of power switches.

For example, when the first switch $SWA_1$ of the first set of switches and the first switch $SWB_1$ of the second set of switches are in the on-state, while all the remaining switches are in the off-state, the first battery group $B_1$ is electrically connected to the first power interface 146 and the other battery groups are isolated from the first power interface 146.

For example, when the first and second switches $SWA_1$ and $SWA_2$ of the first set of switches and the first and the second switches $SWB_1$ and $SWB_2$ of the second set of switches are in the on-state, while all the remaining switches are in the off-state, the first and the second battery groups $B_1$ and $B_2$ are electrically connected in parallel to the first power interface 146 and the other battery groups are isolated from the first power interface 146.

Likewise, when the second and the last switches $SWA_2$ and $SWA_n$ of the first set of switches and the first and second switches $SWB_2$ and $SWB_n$ of the second set of switches are in the on-state, while all the remaining switches are in the off-state, the second and the last battery groups $B_2$ and $B_n$ are electrically connected in parallel to the first power interface 146 and the other battery groups are isolated from the first power interface 146.

Therefore, by selectively switching on or activating power switches which are associated with a selected battery group or a plurality of selected battery groups, while having the power switches which are associated with a deselected battery group or a plurality of deselected battery groups in the off-state or deactivated, the selected battery group or the plurality of selected battery groups is/are connected to the first power interface 146 in parallel and the deselected battery group or the plurality of deselected battery groups is/are electrically disconnected or isolated from the first power interface 146.

A battery group or a plurality of battery groups can also be electrically disconnected or isolated from the second power interface. For example, by turning on the power switch $SWB_2$ and by turning off all the other power switches, including the power switch $SWB_1$, one of the battery groups, that is, the battery group $B_1$, is electrically disconnected or isolated from the second power interface 148, thereby reducing the rated voltage of the second power interface 148 by the battery-group voltage of the battery group $B_1$.

As another example, by turning on the power switch $SWB_3$ of the battery group $B_3$ and by turning off all the other power switches, including the power switch $SWB_1$ and $SWB_2$, two of the battery groups, that is, the battery groups $B_1$ and $B_2$, are electrically disconnected or isolated from the second power interface 148, thereby reducing the rated voltage of the second power interface 148 by the sum of battery-group voltages of the battery groups $B_1$ and $B_2$.

The battery groups which are to form effective members of the battery assembly may be selected by operation of the power switches, for example, where the battery group has an internal switch which is operable to connect or disconnect the battery cells of the battery group from a battery group terminal, as shown in FIGS. 2B and 2C. By selective operating the power switches which are members of the first set and the second set of switches, an intermediate battery group or any intermediate battery groups can be deselected from the battery assembly to contribute power to the second output interface 148.

Therefore, a deselected battery group or a plurality of selected battery groups can be electrically isolated from the first power interface 146 and/or the second power interface 148, by selectively switching off power switches which are associated with the selected battery group or the selected battery groups. When all the associated power switches of a selected battery group are in the off-state, the selected battery group is electrically isolated from the first power interface 146 and the second power interface 148.

In general, a battery group $B_i$ has a first associated power switch $SWA_i$ which connects the battery group to the first power interface 146 and a second associated power switch $SWB_i$ which connects the battery group to the second power interface 148, wherein i is a natural number having a value between 1 and n. For example, the switches $SWA_1$ and $SWB_1$ are associated power switches of the first battery group, the switches $SWA_2$ and $SWB_2$ are associated power switches of the second battery group, and the switches $SWA_n$ and $SWB_n$ are associated power switches of the n-th battery group.

By selectively activating one power switch selected from the first set of power switches and selectively activating one power switch selected from the second set of power switches, while having the remaining power switches in un-activated, that is, in the off-state, the number of battery groups in serial electrical connection with the second output interface can vary between 1 and n.

In example configurations, any one power switch of the second set of power switches, $SWB_1, \ldots, SWB_n$, may be turned on while all the other power switches of the second set of power switches are turned off, irrespective of the switching state of the first set of power switches.

For example, when the first switch $SWB_1$ of the second set of switches is in the on-state while all the remaining switches $SWA_1, \ldots, SWA_n$ and $SWB_2, \ldots, SWB_n$ are in the off-state, the battery groups are electrically isolated from the first power interface 146, but are electrically connected as a cascade of battery groups to the second power interface 148.

For example, when the last switch $SWA_n$ of the first set of switches and the first switch $SWB_1$ of the second set of switches are in the on-state while all the remaining switches $SWA_1, \ldots, SWA_{n-1}$ and $SWB_2, \ldots, SWB_n$ are in the off-state, the battery groups are electrically connected as a cascade of n battery groups to the first power interface 146.

For example, when the second last switch $SWA_{n-1}$ of the first set of switches and the first switch $SWB_1$ of the second set of switches are in the on-state while all the remaining switches $SWA_1, \ldots, SWA_n$ and $SWB_2, \ldots, SWB_n$ are in the off-state, the battery groups are electrically connected as a cascade of n–1 battery groups to the first power interface 146.

In the example configuration of FIG. 2, the first terminal of a battery group which is connected to the first rail 142 is a positive terminal, and the second terminal of a battery group which is connected to the second rail 144 is a negative terminal. In example configurations, the terminal polarities may be reversed such that the first terminal is a negative terminal of a battery group and the second terminal is a positive terminal of a battery group.

In the example configuration of FIG. 2, the battery group which is proximal to the first power interface 146 is labelled as a first battery group while the battery group which is distal to the first power interface 148 is labelled as a last battery group. In other example configurations, the battery group which is proximal to the first power interface 146 is labelled as a last battery group while the battery group which is proximal to the first power interface 148 is labelled as a last battery group, and the above descript shall apply in the reversed order without loss of generality. When in this reversed order, the battery group which is labelled $B_n$ shall be renumbered as $B_1$, the battery group which is labelled $B_{n-1}$ shall be renumbered as $B_2$, the which is labelled $B_1$ shall be renumbered as By, the battery group which is labelled $B_2$ shall be renumbered as $B_{n-1}$ etc. without loss of generality.

In some embodiments, the power switches may be disposed outside of the battery arrangement without loss of generality.

The power management arrangement comprises controllers, sensors, connectors, displays, and/or circuitries which are configured to form an operation system to control and operate the stored energy system. The controller may comprise solid-state devices such as a microprocessor, a cluster of microprocessors, logic arrays, memory devices, input/output interfaces, and data-communication circuitries for facilitating data communication internally and externally.

The operation system may comprise a battery management system (BMS) which is configured to facilitate management of the battery arrangement, an energy management system (EMS) which is configured to facilitate overall management of the system, a human machine interface (HMI) which is configured to facilitate human-machine interaction, and/or other useful peripherals.

The system may operate in a plurality of power operation modes and the controller may be configured with machine instructions to switch the system to operate in one of the power operation modes.

In an example mode, the system is in a photovoltaic charging mode, in which mode the battery arrangement is to be charged by electrical energy coming in from the photovoltaic arrangement. When in the photovoltaic charging mode, the associated power switches of all the battery groups or selected battery groups are activated, so that the all or selected battery groups are connected in parallel with the first power interface, which is a first power port. While in this photovoltaic charging mode, the participating battery groups or the number of participating battery groups can be selected or deselected by operation of the plurality of power switches in manners described above.

In an example mode, the system is in an AC-charging mode, in which the battery arrangement is to be charged by energy coming in from the public grid. To facilitate AC charging, an AC/DC converter is provided at the second power interface. When in the AC-charging mode, only one switch selected from the first and second sets of switches is activated to charge the battery groups in cascade, and all the other switches of the first and second sets of switches are un-activated or de-activated. When in this mode, the voltage of the battery assembly being charged is determined by the position of the on-switch, that is the power switch which is in the on-state.

In an example mode, the system is in a power output mode, in which the battery arrangement is to output power, for example, to an EV, via the second power interface. To output stored electrical energy from the battery arrangement for charging an electrical vehicle (EV), the system may comprise a DC-charger having a universal power input, and charging terminals conforming to EV charging standards such as CHAdeMO, CCS Combo, etc. The DC Charger may be a universal DC charger, for example, a 12.5 kW DC charger. The DC charger has a universal input which is configured to receive HV (high voltage) DC, 1- or 3-phase AC as input power and a variable DC output of between 50V and 500V. The system is fully scalable and can be configured to have a power rating which is a multiple of the nominal power rating, for example, 12.5 kW, 25 kW, 37.5 kW, 50 KW etc.

The system may comprise a power converter for converting output power of the battery arrangement to charging power suitable for charging an electrical vehicle. The power converter may comprise a DC-DC converter, DC-AC converter, or a universal converter, depending the charging requirements of the EV.

Referring to FIG. 3, the battery arrangement comprises a first rail 142 which is configured as a first power bus and a second rail 144 which is configured as a second power bus. The first rail 142 is electrically connected to a first output terminal of the solar power arrangement and the second rail 144 is electrically connected to a second output terminal of the solar power arrangement.

The battery arrangement comprises a battery assembly which includes an example plurality of n battery groups $B_1$, $B_2$, $B_3$, $B_4$, $B_5$, $B_6$, $B_7$, $B_8$ connected in series to form a cascade, where n equals 8. Each battery group comprises an example plurality of battery modules in parallel connection. Each battery group $B_i$ is associated with a first power switch $S_{i+}$ and a second power switch $S_{i-}$, where i is a natural number having a value of between 1 and 8.

The first power switch $S_{i+}$ is connected to the first terminal of the battery group $B_i$ and corresponds to the first power switch switches $SWA_i$. The first power switch $S_{i-}$ is connected to the second terminal of the battery group $B_i$ and corresponds to the second power switch switches $SWB_i$.

When the first power switch $S_{i+}$ is activated, the first terminal of the battery group is electrically tied to the first rail 142. When the first power switch $S_{i+}$ is deactivated, the first terminal of the battery group is electrically isolated from the first rail 142. When the second power switch $S_{i-}$ is activated, the second terminal of the battery group is electrically tied to the second rail 144. When the first power switch $S_{i+}$ is deactivated, the second terminal of the battery group is electrically isolated from the second rail 144.

The switches S1+, S2+, ..., S8+ of the battery groups collectively form a first set of switches, and the power switches S1−, S2−, ..., S8− of the battery groups collectively form a second set of switches. The first terminals of the battery groups are connected to the first rail 142 by means of the first set of switches S1+, S2+, ..., S8+, and the second terminals of the battery groups are connected to the second rail 144 by means of the second set of switches S1−, S2−, ..., S8−.

In example embodiments such as the present, each one of the switches of the first set of switches S1+, S2+, ..., S8+, and each one of the switches of the second set of switches S1−, S2−, ..., S8−, is individually switchable, for example, by the energy management system (EMS).

The EMS is configured to facilitate management of energy of the system. The EMS may comprise a controller or a cluster of controllers. The controller may be a microprocessor-based controller, a logic-array based controller, or a combination thereof. The system comprises a data bus and a control bus to facilitate control of the system by the EMS.

The EMS comprises a charge regulator, or more specifically a solar charge regulator (SCR). The SCR is configured to regulate output voltage of the aggregate of photovoltaic panels so that the battery arrangement can be charged with a regulated charging power. In example embodiments such as the present, the SCR is configured to regulate the photovoltaic power output at the rated voltage of a battery group or a plurality of battery groups in series.

The aggregate of photovoltaic panels and the SCR cooperate to form a photovoltaic power conversion arrangement having a regulated power output. The regulated power output comprises a first power output terminal of a first polarity and a second power output terminal of a second polarity opposite to the first polarity.

For example, each of the battery groups of the battery arrangement has a nominal rated voltage of 50V, and the SCR has a regulated output voltage which is configured for charging a battery group.

In an example mode of operation, the first set of switches and the second set of switches are closed at the same time to facilitate charging of the battery arrangement. In this mode of operation, all of the battery groups are connected for charging while in parallel connection, and the charging power will go through a plurality of current paths defined by the corresponding plurality of groups of switches S1+, S1−; S2+, S2−; S3+, S3−; S4+, S4−; S5+, S5−; S6+, S6−; S7+, S7−; S8+, S8−.

In the example arrangement, each battery group has a first rated voltage and the SCR has a second rated voltage which is at least slightly higher, say 1.5V to 2V higher, in order to facilitate charging of a battery group.

In an example mode of operation, the switches are selectively activated to facilitate selective battery charging while the battery groups are in cascade connection.

For example, a first switch S4+ of a battery group B4 and a corresponding second switch S4− of the battery group B4 may be selectively activated to close while all other switches of the first and second set of switches are opened. When in this selective activation configuration, only one of the battery groups, namely, battery group B4, will be charged by the SCR.

For example, a battery group B1 may be selectively charged by closing the first switch S1+ and the corresponding second switch S1− of that battery group so that charging power will flow from the photovoltaic power conversion arrangement to the battery group via the first bus and the second bus.

In example embodiments, the SCR is configured to output electrical power for charging a plurality of battery groups of the battery arrangement while the battery groups in cascaded connection.

For example, by closing the first switch S3+ of the third battery group B3 and the second switch S2− of the second battery group, while leaving the remain switches deactivated, two adjacent battery groups B2 and B3 can be charged by the photovoltaic power conversion arrangement.

For example, by closing the first switch S5+ of the fifth battery group B5 and the second switch S4− of the fourth battery group, while leaving the remain switches deactivated, two adjacent battery groups B4 and B35 can be charged by the photovoltaic power conversion arrangement.

Therefore, by selective activation and deactivation of switches of the first set of switches and switches of the second set of switches, a single battery group of a selective plurality of battery groups of the battery arrangement can be selectively charged, while the battery groups forming the battery arrangement are in cascaded connection.

While adjacent battery groups of the plurality of battery groups forming the battery arrangement are connected in cascaded by fixed connection, the inter-battery group connection may be by switches, for example, by switches controlled by the EMS.

The battery arrangement is configured for outputting storing electrical energy after having received and stored electrical energy coming from the photovoltaic power conversion arrangement.

The battery arrangement may be configured for outputting power to charge electrical vehicles and/or for outputting power to the power grid, as shown in FIG. 3.

The EMS is configured to operate the battery arrangement in a plurality of alternative operation modes. In an example mode, the EMS is to operate the switching arrangement to facilitate recharging of the battery arrangement. In another example mode, the EMS is to operate the switching arrangement to facilitate output of stored power from the battery arrangement.

When in the recharging mode, the EMS is to operate the switching arrangement in a first configuration such that switches selected from the first and second switches are activated to close to form a charging circuit, with the other non-selected switches deactivated to open.

When in the power output mode, the EMS is to operate the switching arrangement in a second configuration such that the output voltage is equal to the sum of voltages of the battery groups forming the battery arrangement. When in this mode of operation, the first and second set of switches are deactivated to isolate the battery arrangement from the PV buses, which include the first bus and the second bus.

The SCR is configured to regulate power output of the photovoltaic arrangement. An SCR is a sophisticated multifunctional device which comprises a maximum power point tracker (MPPT) for optimization of solar power generation by PV modules. An SCR may have built-in ancillary functions such as DC/DC conversion and/or DC/AC inversion. The DC/DC conversion may be configured to control charging and discharging of solar batteries of the system.

The DC/AC inversion is configured for uploading AC power originated from the LVDC solar power to the gird, as shown in FIG. 4.

An SCR inverter may have dual outputs, as shown in the configuration of FIG. 5. The example hybrid PV system of FIG. 5 comprises a set of PV panels which are arranged to form a PV power source and an SCR connected to the power output of the PV source to provide a regulated power output. The SCR comprises a first output which is connected to a load and a second output which is connected to the AC power grid for uploading power thereto. The example first power output is connected to a set of LVDC solar batteries so that the solar batteries can be charged by regulated power output of the PV power source. The LVDC solar batteries have a regulated power output which is connected to a power converter, for example, a DC-DC converter for outputting power to a DC load, which is LED lighting in the example.

The example SCR of FIG. 5 is a bidirectional device. The bidirectional SCR is operable so that the solar batteries are charged by AC grid power, for example, when there is no sufficient solar power. Charging of the solar batteries by the AC grid power when there is no sufficient solar power, for example, during off-peak hours, is also a means to optimize power utilization, for example, to enhance public grid efficiency through peak-shaving, balancing consumption and generation between peak- and off-peak-hours during a day.

A typical SCR is completed with several special conversion functions in a single package. An SCR can cooperate with very low PV modules and batteries voltages, such as the 12 v standard of lead-acid batteries. A PV system which is configured to have a utility output would need to have its PV output upconverted. For example, the AC grid voltage is at least many times the standard 12V and voltage up conversion is required in order that the PV system can interface with the grid system. To facilitate a high voltage conversion ratio, multiple-step conversion with buck-and-boost (voltage step-up and -down) topologies are typically employed. On the other hand, for high power operations, for example, EV rapid charging, it is expected that the conversion ratio should not exceed 2:1 to maintain a reasonable conversion efficiency.

Conventional solar batteries before the arrival of Li-ion (Lithium-ion) batteries have long adopted special lead-acid technology such as flooded type, gel type, or AGM (Absorbed Glass Mat) type lead-acid batteries. Lead-acid solar batteries have relatively longer cycle-life than the conventional 12V automobile battery, but both are very low in energy density compared to advanced LV batteries, and are not economical for cycling applications (the solar-powered street-light for example) other than for flood-charging applications (such as the UPS).

More recently, LFP (Lithium-ion Ferro Phosphate) type Li-ion batteries are used in PV systems. The LFP technology facilitates a higher energy density and relatively longer cycle-life than the lead-acid counterparts on single cell level, and both are very similar in the characteristics, in charge and discharge curves. LFP batteries can be used for direct replacement of the lead-acid solar batteries, and the applications of PV systems are extended due to availability of LFP batteries.

However, there is a major deficiency in the LFP batteries still, which is of its low energy efficiency in the operation cycle between charge and discharge. And that after a few hundred cycles, the battery cells in a system will have wider variances in the charge and discharge curves towards the beginnings and ends of charging and discharging, then uneven aging biased cell unbalances occur. This is why most LFP manufacturers would advise their OEM (Original Equipment Manufacturers) customers to stop charging the cells at 90% SOC and end discharging at 10% SOC in their applications of the batteries, in order to prolong the service-life of their systems. But this is huge derating in addition to the low energy efficiency of the LFP batteries. Moreover, the current LFP technology is basically not suitable for HVDC systems, because in HVDC systems, BMS (Battery Management System) control of charging and discharging is much more reliant on the uniformity and balancing of the cells. Otherwise, battery safety issues will arise.

In the example system of FIG. 3, a two-step conversion is utilized since a high conversion ratio required for LVDC to AC is required.

An example hybrid PV system of FIG. 6 is substantially identical to that of FIG. 3, except that a DC charger and peripheral devices are utilized to facilitate direct DC charging of an EV. The hybrid PV system comprises a PV power source, an SCR, a battery arrangement, a power converter and a DC-charger. The power converter is a high-power LVDC/HVDC converter which interconnects the battery arrangement and the DC-charger, which is configured to connect to an EV to perform charging.

The PV systems of the present disclosure, as shown for example in FIGS. 3 and 8, may be deployed in an EV charging system as shown in FIG. 9.

While the present disclosure is made with reference to example embodiments and figures, persons skilled in the art would appreciate that the embodiments and figures are not intended to limit the scope of disclosure.

While the example systems are configured for use with a photovoltaic arrangement, it would be appreciated that the photovoltaic arrangement can be replaced by a power source or a load without loss of generality.

The invention claimed is:

1. A stored-energy power system comprising a photovoltaic arrangement for converting solar energy into electrical energy for output, a battery arrangement, and a power management arrangement;
   wherein the battery arrangement comprises a plurality of battery cells, a first power interface, a second power interface, and a switching arrangement;
   wherein the plurality of battery cells is arranged into a plurality of battery groups, each battery group comprising a single battery cell or a plurality of interconnected battery cells;
   wherein the first power interface is coupled to the photovoltaic arrangement for receiving solar-electrical energy;
   wherein the second power interface is configured for power input from an external power source or power output to an external load;
   wherein the switching arrangement is operable in a first mode or a second mode;
   wherein the battery arrangement is electrically connected to the first power interface and the first power interface has a first rated voltage when the switching arrangement is in the first mode; and
   wherein the battery arrangement is electrically connected to the second power interface, and the second power interface has a second rated voltage when the switching arrangement is in the second mode, the second rated voltage being higher than the first rated voltage.

2. The power system of claim 1, wherein the plurality of the battery groups is connected in parallel to the first power interface when the switching arrangement is in the first mode.

3. The power system of claim 1, wherein some battery groups selected from the plurality of battery groups forming the battery arrangement are connected in parallel to the first power interface when the switching arrangement is in the first mode.

4. The power system of claim 1, wherein some battery groups are selected from the plurality of battery groups forming the battery arrangement to form a plurality of battery sub-groups, and the plurality of battery sub-groups is connected in parallel to the first power interface when the switching arrangement is in the first mode.

5. The power system of claim 1,
wherein the battery arrangement comprises a first power rail, a second power rail, a plurality of power switches including a first set of power switches and a second set of power switches;
wherein each battery group has a first battery-group terminal having a first electrical polarity, a second battery-group terminal having a second electrical polarity opposite to the first electrical polarity, and a battery group voltage measured between the first group terminal and the second group terminal;
wherein the first battery-group terminals of the plurality of battery groups are connected to the first power rail via the first set of power switches,
wherein the second battery-group terminals of the plurality of battery groups are connected to the second power rail via the set of power switches, and
wherein the first power rail and the second power rail cooperate to define the first power interface.

6. The power system of claim 5, wherein the first set of power switches comprises a first plurality of power switches and the second set of power switches comprises a second plurality of power switches, and wherein each said power switch is individually switchable to operate in an on-state or an off-state by an electrical control signal.

7. The power system of claim 6, wherein the first power interface has a rated voltage and the rated voltage is variable by selectable operation of the power switches.

8. The power system of claim 5, wherein the first power interface is electrically coupled to the first terminal of a battery group when a power switch connecting the first power rail and the first terminal is in an on-state, and electrically coupled to the second terminal of a battery group when a power switch connecting the second power rail and the second terminal is in an on-state.

9. The power system of claim 1,
wherein the battery arrangement comprises a plurality of n battery groups connected in a cascade to form a battery assembly, n being a natural number larger than 1 and each battery group having a battery group voltage;
wherein the cascade of the n battery groups comprises a first battery group and an n-th battery group which is a last battery group of the cascade; and
wherein the cascade of the n battery groups has a cascade voltage equal to sum of the battery group voltages of the n battery groups, the cascade voltage being measured between a first terminal of the first battery group and a second terminal of the last battery group.

10. The power system of claim 9, wherein the n battery groups are hardwire-connected to form the cascade of the n battery groups.

11. The power system of claim 10, wherein the first rated voltage of the first power interface is variable between the battery group voltage and n times the battery group voltage.

12. The power system of claim 11, wherein the first rated voltage of the first power interface is incremental or decremental in discrete voltage steps, and each discrete voltage step is equal to the battery group voltage.

13. The power system of claim 9, wherein the second rated voltage of the second power interface is variable between the battery group voltage and n times the battery group voltage, and wherein the second rated voltage of the second power interface is incremental or decremental in discrete voltage steps, and each discrete voltage step is equal to the battery group voltage.

14. The power system of claim 1, wherein the first rated voltage is at 50V or below.

15. The power system of claim 1, wherein the second rated voltage is at 300V or above.

16. The power system of claim 1, wherein the power management arrangement is configured to control operation of the switching arrangement, including controlling the switching arrangement to operate in the first mode or the second mode.

17. The power system of claim 1, wherein the battery assembly comprises a first battery-assembly terminal, a second battery-assembly terminal, and has a battery-assembly terminal voltage which is measured between the first battery-assembly terminal and second battery-assembly terminal; wherein the second power interface is a power port comprising a first power port terminal and a second power port terminal; wherein one of the first battery-assembly terminal or the second battery-assembly terminal is permanently connected to one of the first power port terminal or second power port terminal, and wherein the other one of the first battery-assembly terminal or the second battery-assembly terminal is permanently connected to the other one of the first power port terminal or second power port terminal by one of the plurality of power switches.

18. The power system of claim 17, wherein the battery-assembly terminal voltage is selectable by operation of the plurality of power switches.

19. The power system of claim 1, wherein the power management arrangement comprises a solid-state controller.

20. A stored-energy apparatus comprising a battery arrangement, a switching arrangement, a power management arrangement, and an apparatus housing;
wherein the battery arrangement comprises a plurality of battery cells, a first power interface and a second power interface;
wherein the plurality of battery cells is arranged into a plurality of battery groups, each battery group comprising a single battery cell or a plurality of interconnected battery cells;
wherein the first power interface is configured for coupling to a first power source or a first load;
wherein the second power interface is configured for coupling to a second power source or a second load;
wherein the switching arrangement is operable in a first mode or a second mode;
wherein the battery arrangement is electrically connected to the first power interface and the first power interface has a first rated voltage when the switching arrangement is in the first mode; and
wherein the battery arrangement is electrically connected to the second power interface, and the second power interface has a second rated voltage when the switching arrangement is in the second mode, the second rated voltage being higher than the first rated voltage.

* * * * *